(12) United States Patent
Obdeijn

(10) Patent No.: US 6,857,611 B2
(45) Date of Patent: Feb. 22, 2005

(54) DEVICE SUITABLE FOR SUSPENDING A COMPONENT, SUCH AS A FLAT PANEL DISPLAY SCREEN, AS WELL AS AN INTERMEDIATE PLATE AND A CARRIER

(75) Inventor: Rudolf Fransiscus Andreas Obdeijn, Eindhoven (NL)

(73) Assignee: Vogel's Holding B.V., Eindhoven (NL)

( * ) Notice: Subject to any disclaimer, the term of this patent is extended or adjusted under 35 U.S.C. 154(b) by 0 days.

(21) Appl. No.: 10/349,784

(22) Filed: Jan. 22, 2003

(65) Prior Publication Data

US 2003/0141425 A1 Jul. 31, 2003

(30) Foreign Application Priority Data

Jan. 25, 2002 (NL) .............................................. 1019833

(51) Int. Cl.⁷ ................................................. A47H 1/10
(52) U.S. Cl. ..................... 248/317; 40/606.09; 40/757; 248/551
(58) Field of Search ................................. 248/317, 551, 248/553, 489, 495, 496; 40/757, 759, 795, 606.09

(56) References Cited

U.S. PATENT DOCUMENTS

| | | | | |
|---|---|---|---|---|
| 648,523 A | * | 5/1900 | Pierce | 40/795 |
| 2,177,215 A | * | 10/1939 | Hodgkinson | 40/200 |
| 3,074,680 A | * | 1/1963 | Stewart | 248/470 |
| 3,567,170 A | * | 3/1971 | Albee et al. | 248/475.1 |
| 3,898,394 A | | 8/1975 | Ward et al. | |
| 4,641,441 A | * | 2/1987 | Roth | 40/792 |
| 4,858,351 A | * | 8/1989 | Sewell et al. | 40/712 |
| 5,405,117 A | | 4/1995 | Davis | 248/333 |
| 2004/0011935 A1 | | 1/2004 | Groesen | 248/317 |

FOREIGN PATENT DOCUMENTS

| | | |
|---|---|---|
| CH | 653 464 A5 | 12/1985 |
| DE | 37 44 704 A1 | 12/1988 |
| DE | 89 13 931.3 | 3/1991 |
| DE | 298 09 098 U1 | 9/1998 |
| EP | 1 063 465 A1 | 12/2000 |
| EP | 1 180 636 A1 | 2/2002 |

* cited by examiner

*Primary Examiner*—Korie Chan
(74) *Attorney, Agent, or Firm*—Ladas & Parry LLP (57) ABSTRACT

A device suitable for suspending a component, such as a flat panel display screen, which device includes a carrier comprising at least one hook or one recess and a nearby opening, as well as an intermediate plate comprising at least one recess which can be positioned over said hook or a hook which can be positioned in said recess, as well as a passage positioned coaxially opposite the opening present in the carrier. The intermediate plate further comprises a resilient strip extending substantially parallel to the intermediate plate, which strip is provided with a pin which is supported in the passage. The pin is movable against spring force from a first position, in which it is disposed in the opening in the carrier, to a second position, in which it is disposed outside said opening.

12 Claims, 7 Drawing Sheets

DEVICE SUITABLE FOR SUSPENDING A COMPONENT, SUCH AS A FLAT PANEL DISPLAY SCREEN, AS WELL AS AN INTERMEDIATE PLATE AND A CARRIER

TECHNICAL FIELD

The invention relates to a device suitable for suspending a component, such as a flat panel display screen.

BACKGROUND INFORMATION AND BRIEF DESCRIPTION OF THE DISCLOSED TECHNOLOGY

The invention also relates to an intermediate plate and to a carrier suitable for use with such a device.

In relatively large spaces, such as exhibition buildings, ceiling-suspended display screens are frequently used for providing visitors with information they may require. Recently, flat panel display screens, such as plasma displays, have been developed. Such relatively heavy display screens must be relatively easy to suspend, so that a person will not have to lift the display screen unnecessarily long. Furthermore it must be relatively easy for an authorised person to detach the display screen again. On the other hand, accidental or unauthorized removal of the display screen must be prevented.

Consequently it is an object of the invention to provide a device which enables easy suspension of a component.

This objective is accomplished with the device according to the invention in that the device includes a carrier comprising at least one hook or one recess and a nearby opening, as well as an intermediate plate comprising at least one recess which can be positioned over said hook or a hook which can be positioned in said recess, as well as a passage positioned coaxially opposite the opening present in the carrier, which intermediate plate further comprises a resilient strip extending substantially parallel to the intermediate plate, which strip is provided with a pin which is supported in the passage, said pin being movable against spring force from a first position, in which it is disposed in the opening in the carrier, to a second position, in which it is disposed outside said opening.

The intermediate plate need to be connected to a rear side of the component, such as the flat panel display screen. The carrier need to be connected to a floor-, ceiling- or wall-mounted construction. Subsequently, the intermediate plate and the component connected thereto can be hung on a hook on the carrier via said recess.

The pin is thereby moved in a direction away from the carrier against the spring force of said strip. The moment the recess is correctly positioned over the hook, the pin will move under spring force through the passage in the intermediate plate into the opening present in the carrier. At that point, the pin has effected a locking engagement between the intermediate plate and the carrier.

One embodiment of the device according to the invention is characterized in that the intermediate plate comprises four recesses which are symmetrically disposed relative to the passage, with the strip extending diagonally between said four recesses.

This makes it possible to connect the intermediate plate to the component in four different ways, whilst at least one recess is available in each case for connection to the hook on the carrier.

Another embodiment of the device according to the invention is characterized in that one end of the strip can be moved against spring force by means of an unlocking mechanism.

The movement of one end of the strip against spring force by means of an unlocking mechanism causes the pin to be moved in a direction away from the carrier, as a result of which the pin is moved out of the opening in the carrier. The intermediate plate and the component connected thereto can then be lifted off the carrier.

Another embodiment of the device according to the invention is characterized in that the intermediate plate comprises at least one guide which is movably connected to the intermediate plate.

The guide can be fixed to the component, and because the guide is movable relative to the intermediate plate, a desired adjustment with respect to points of attachment present on the component can be obtained.

Another embodiment of the device according to the invention is characterized in that a section comprising two staggered strips as well as a bridge member interconnecting said strips is present on a side of said guide that faces away from the intermediate plate, and each strip is provided with openings.

As a result of the presence of the various openings in the strips, it is possible in practically all cases to connect the section to the component.

BRIEF DESCRIPTION OF THE DRAWINGS

The invention will be explained in more detail hereinafter with reference to the drawing, in which.

Like parts are indicated by corresponding numerals in the FIGS.

DETAILED DESCRIPTION

Figure 1:
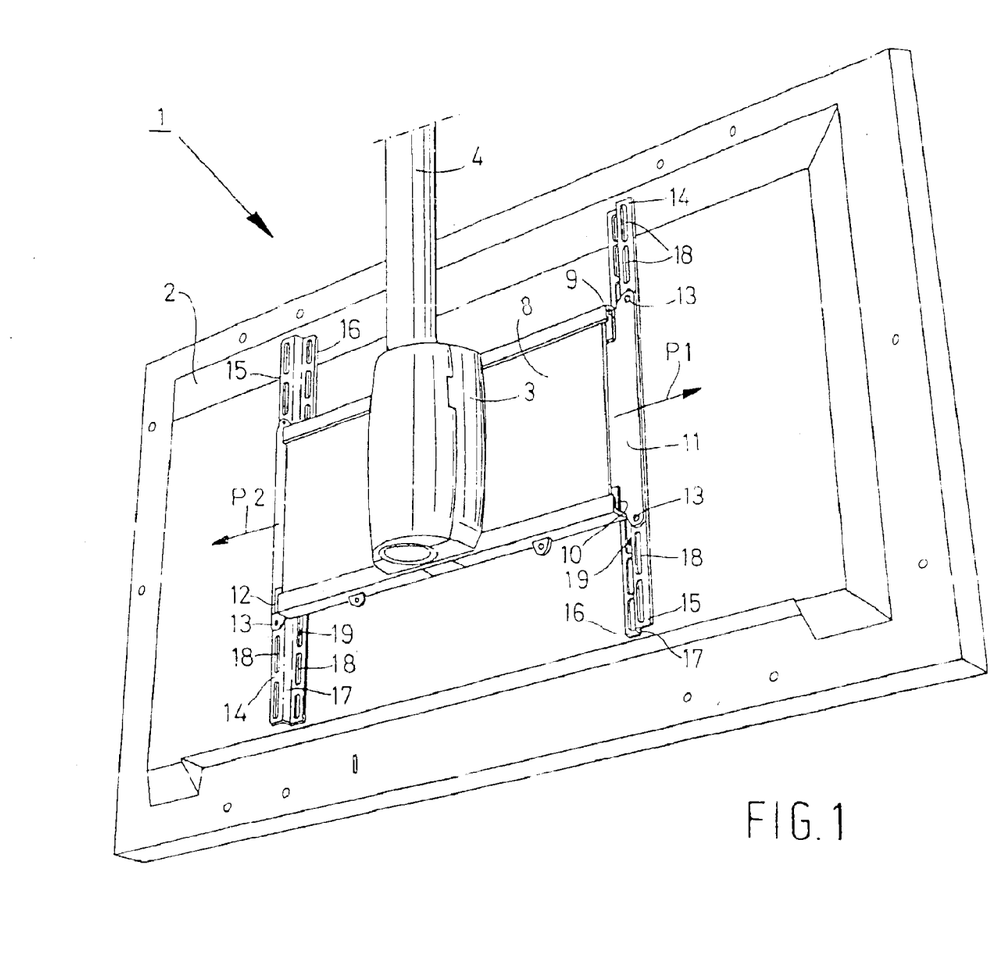
FIG. 1 is a perspective rear view of a display screen suspended by means of a device according to the invention.
Figure 2:
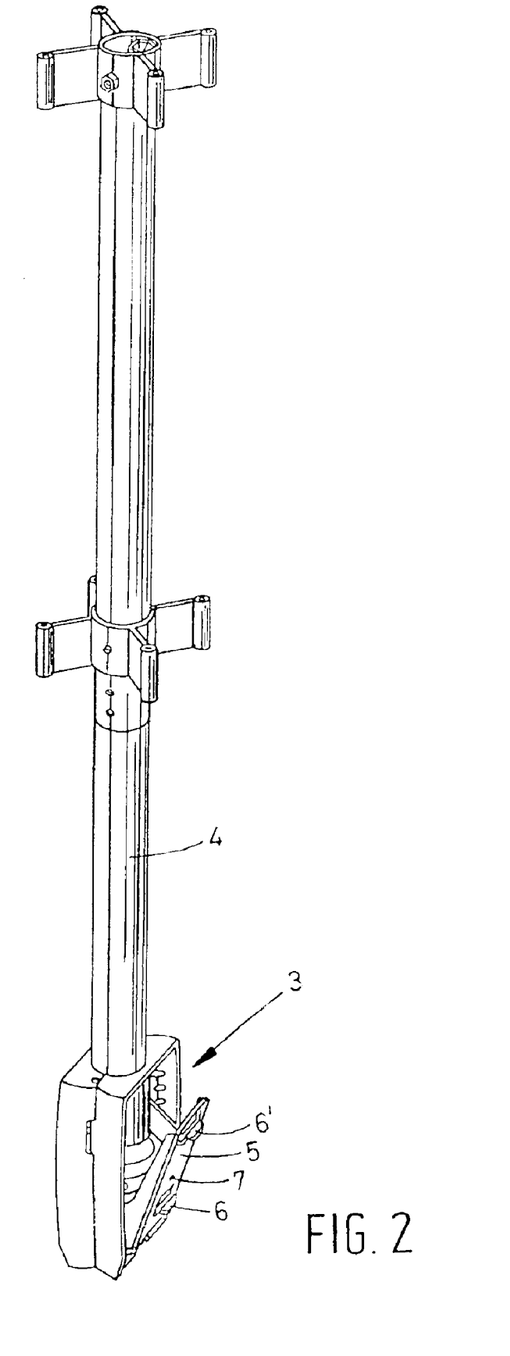
FIG. 2 is a perspective view of a carrier suspended from a tube.

FIG. 1 shows a device by means of which a flat panel display screen 2, such as a plasma display, is connected to a vertically extended tube 4 via a carrier 3. The carrier 3 and the attachment of the carrier 3 to the tube 4 form part of a separate patent application of the present applicant. As is shown in FIG. 2, the carrier 3 comprises a tiltable backplate 5 and spaced-apart hooks 6 formed thereon. An opening 7 is present in the backplate 5 between the hooks 6.

The device 1 furthermore comprises an elongated intermediate plate 8, which is provided with guide sections 9, 10 on both longitudinal sides. Two guides 11, 12 are slidably arranged over said guide sections via U-shaped edges. The guide 11 is movable in the direction indicated by the arrow P1 and in the opposite direction, whilst the guide 12 is movable in the direction indicated by the arrow P2 and in the opposite direction. Connected to each guide 11, 12 by means of two sets of bolts and nuts 13 is a Z-shaped section 14. Said Z-shaped section 14 extends transversely to the directions indicated by the arrows P1, P2. Each Z-shaped section comprises two staggered strips 15, 16, as well as a bridge member 17 interconnecting said strips. The strips 15, 16 are each provided with elongated openings 18, with the openings 18 present in the strips 15, 16 being staggered relative to each other. The openings 18 have different lengths. The sets of bolts and nuts 13 extend through openings present in the strips 15. The display screen 2 is connected to the Z-shaped sections 14 by means of bolts 19 extending through openings 18 present in the strips 16. Every commercially available flat panel display screen is provided with threaded holes at the rear side, via which the display screen can be suspended. The spacing between said holes varies according to the particular type of display screen, however. In the situation that is shown in FIG. 1, the horizontal spacing between the holes 18 in the strips 16 can be adapted to the spacing between the openings present in the display screen 2 by moving the guides 11, 12 further out of the plate 8. Since the openings in the strips 16 are elongated, it is possible in practically all cases to find at least two openings 18 through which bolts can be passed after adjustment of the horizontal spacings, which bolts subsequently fit in openings present in the display screen.

If no openings 18 are available in the strips 16, it is possible to disconnect the Z-shaped sections 14 from the carriers 11, 12, after which the strips 16 are connected to the carriers 11, 12 instead of the strips 15. The display screen 2 can now be connected to the strips 15. Since the elongated openings 18 present in the strips 15 are staggered relative to the openings 18 present in the strips 16, it is possible in that case to find a number of openings 18 through which the bolts 19 can be passed for connecting the display screen 2.

In addition to that it is possible to attach the sections 14 to the carriers 11, 12 via the strips 15, for example, in order to obtain a greater spacing between the strips to be connected to the display screen 2, in which situation the strips 16 face away from each other.

Figure 3A:
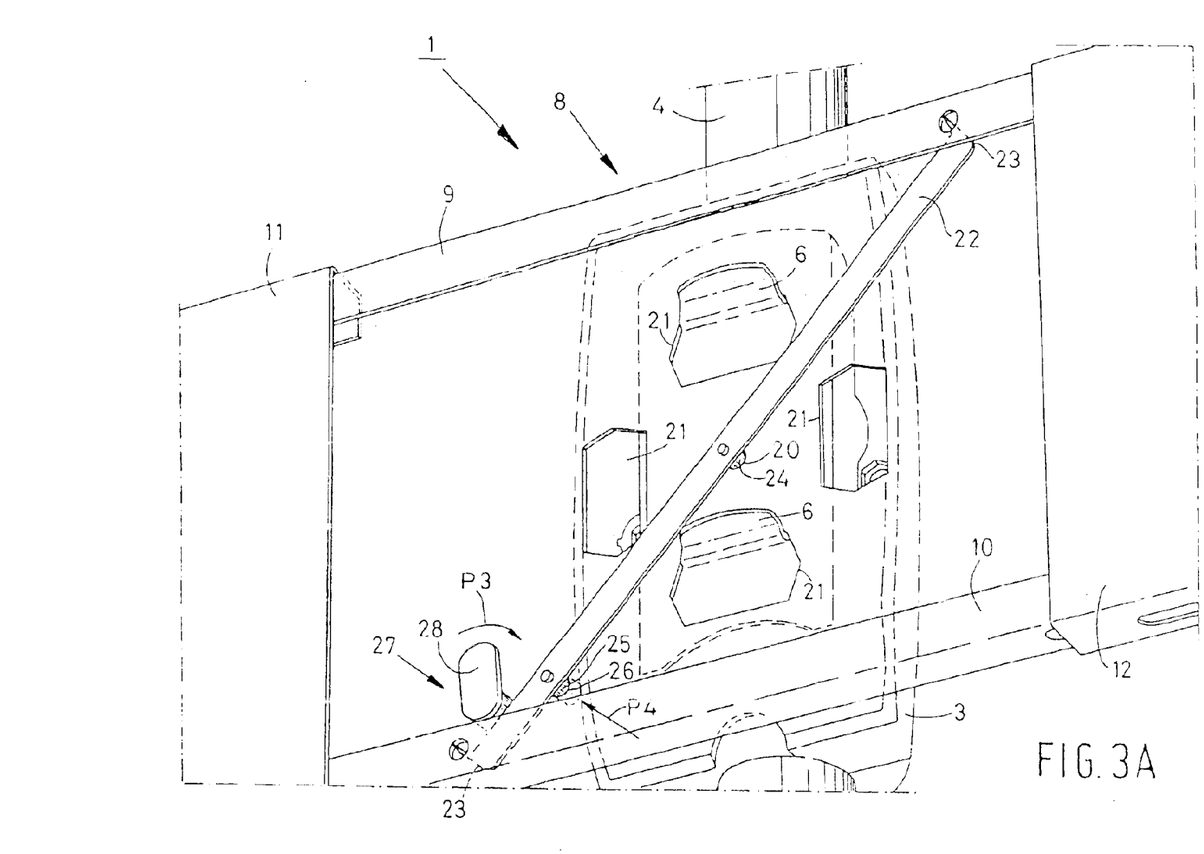
FIGS. 3A and 3B are views of a front side of a device according to the invention, showing a position in which the strip can be unlocked and a position in which the strip is locked, respectively.

FIG. 3a is a front view of a device 1 showing that the intermediate plate 8 is provided with a number of recesses 21 symmetrically disposed round a passage 20. The intermediate plate 8 furthermore includes an elongated metal strip 22, which is pivotally connected to the guide sections 9, 10 via the flanged edges 23. The strip 22 furthermore includes a pin 24, which is slidably accommodated in the passage 20. A pin 25 is connected to the strip 22 on a side of the strip 22 remote from the end 23. The pin 25 extends through an opening 26 present in the intermediate plate 8.

The intermediate plate 8 furthermore includes a lock 27 comprising a lip 28 which pivots in the direction indicated by the arrow P3.

Figure 5:
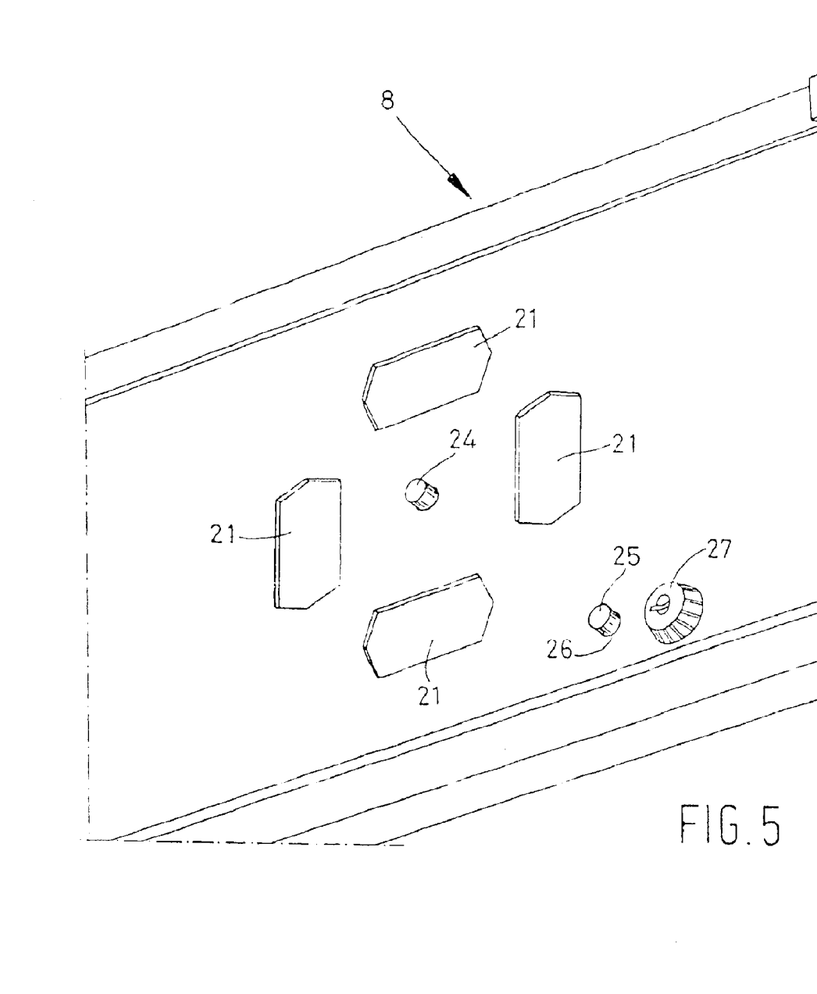
FIG. 5 is a rear view of the intermediate plate that is shown in FIG. 4.

In the situation that is shown in FIG. 3A, the hooks 6 on the carrier 3 are accommodated in the recesses 21, so that the intermediate plate 8 hangs on the carrier 3. The pin 24 extends through the passage 20 in the intermediate plate into the opening 7 present in the backplate 5 in that situation. This makes it impossible to lift the intermediate plate 8 off the backplate 5. If a person wishes to lift the intermediate plate 8 off the hooks 6, he will have to press the pin 25 in the direction indicated by the arrow P4 in FIG. 3A from a side which is shown in FIG. 5, causing the strip 22 to bend against the spring force of the strip 22. As a result the pin 24, which is likewise disposed near the centre of the strip 22, is moved in a direction away from the carrier and out of the opening 7 in the backplate 5. The intermediate plate 8 can now be lifted off the carrier together with the display screen 2 connected thereto.

Figure 3B:
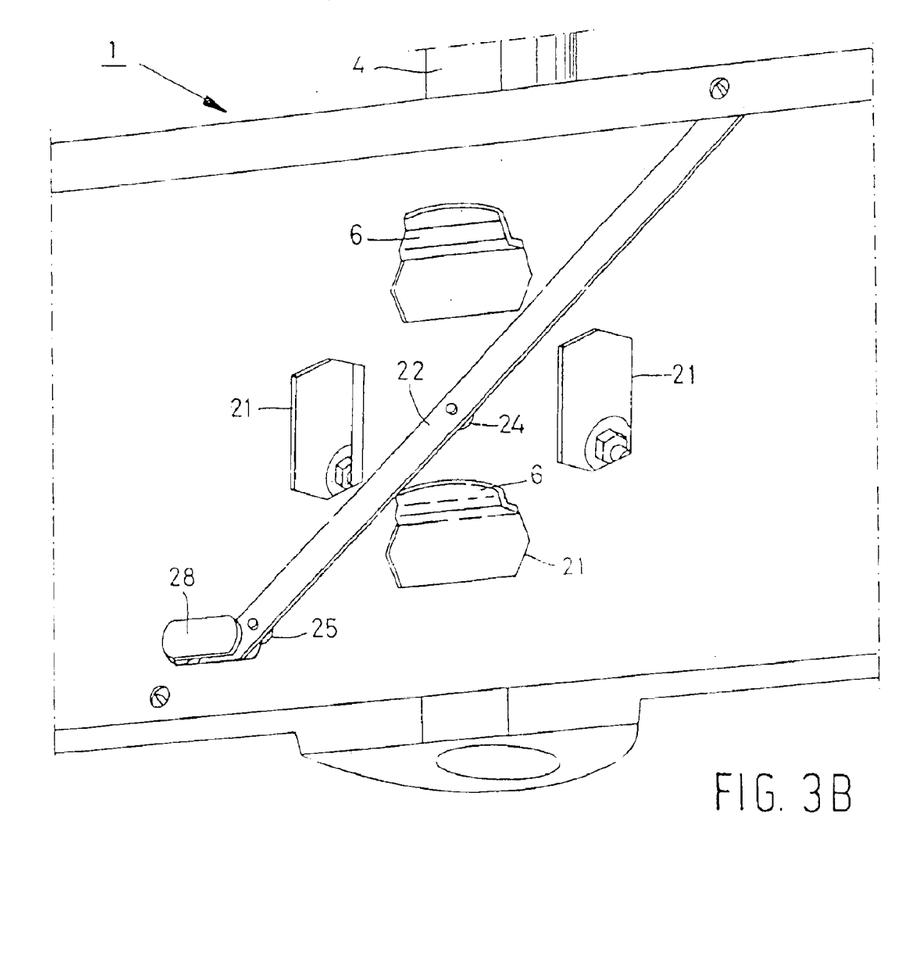

In order to prevent the intermediate plate 8 becoming detached accidentally or undesirably (in the case of theft, for example), it is possible to rotate the lip in the direction indicated by the arrow P3 from the position indicated in FIG. 3A to the position indicated in FIG. 3B by means of a key to be inserted into a lock 27, in which latter position the lip 28 is positioned over the strip 22. In this position of the lip 28 it is not possible to move the pin 25 in the direction indicated by the arrow P4, as a result of which it is not possible to remove the pin 24 from the opening 7 in the backplate 5, either.

Figure 4:
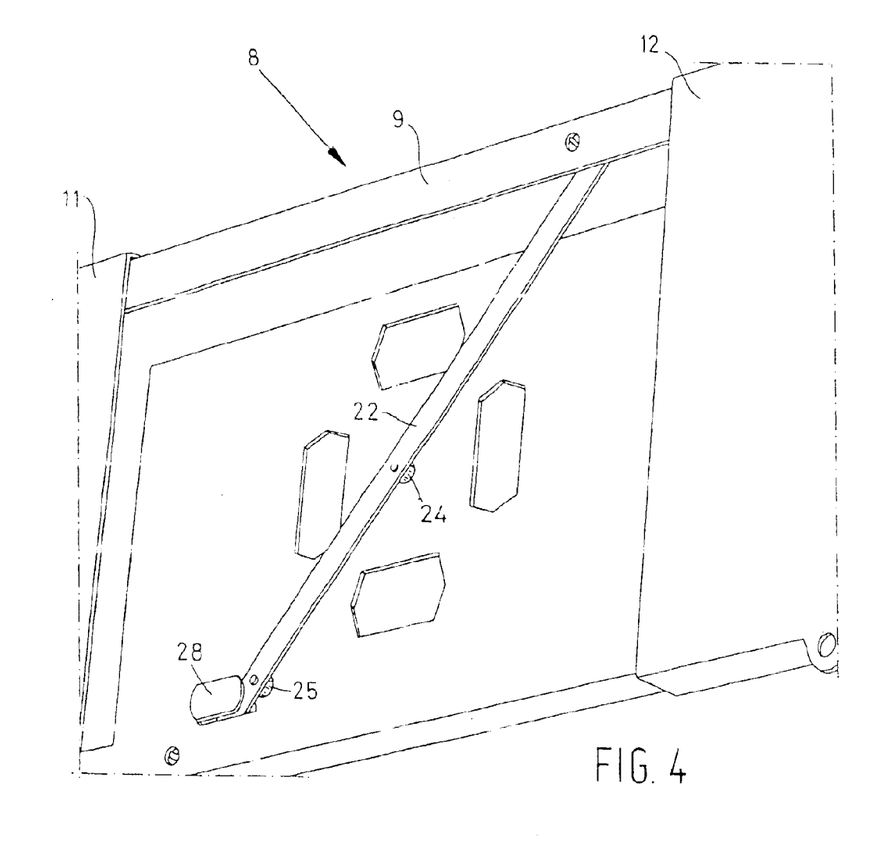
FIG. 4 shows the intermediate plate of the device that is shown in FIG. 3B.

FIG. 4 only shows the intermediate plate 8.

FIG. 5 shows the other side of the intermediate plate 8 that is shown in FIG. 4, in which the pin 24 projecting from the intermediate plate 8 is clearly visible.

Figure 6:
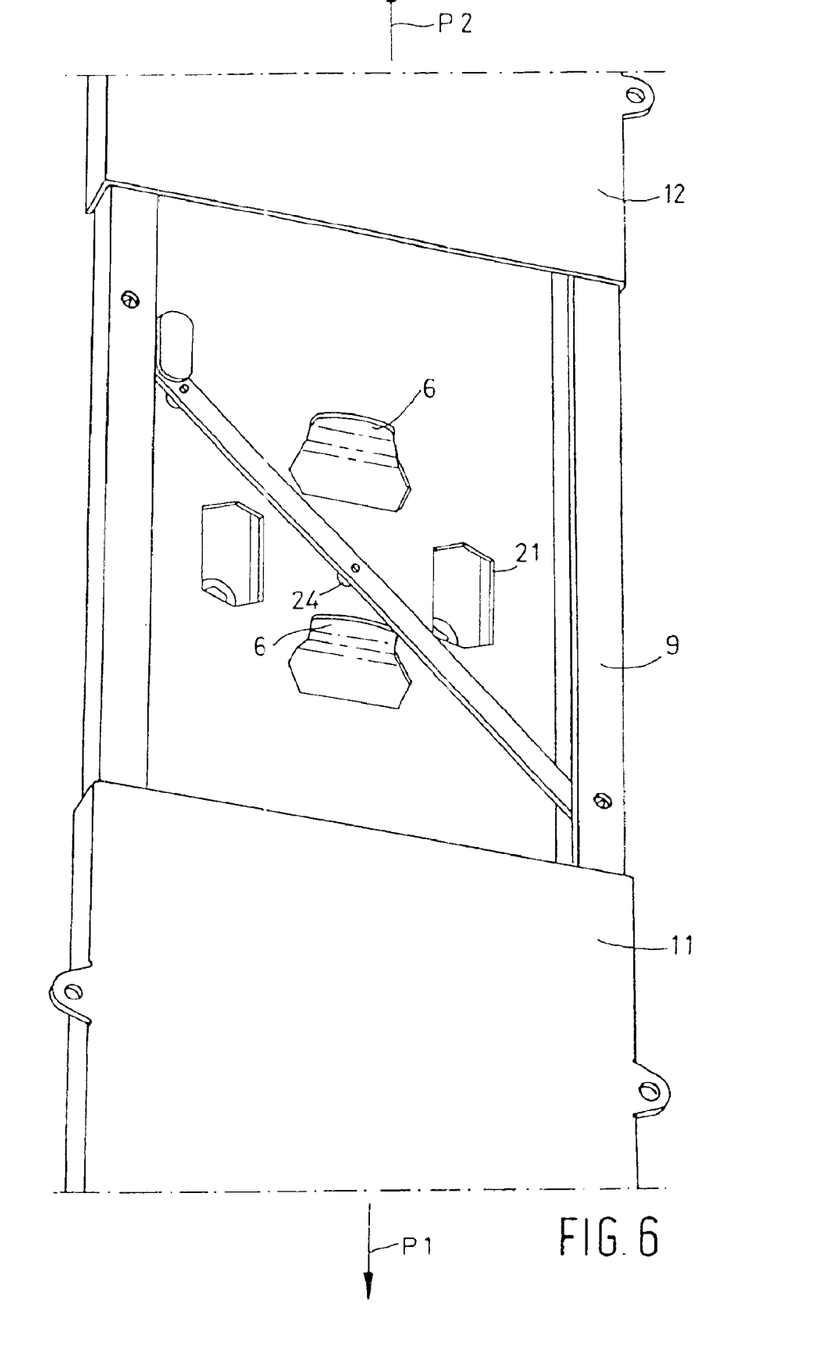
FIG. 6 shows the device of FIG. 4, in which an intermediate plate is rotated 90° before being connected to the carrier.

If the component to be suspended is relatively elongated, with the long side extending substantially vertically, the intermediate plate 8 can be rotated 90° to the position shown in FIG. 6. The guides 11, 12 can again be moved in the directions indicated by the arrows P1, P2, which extend vertically in the situation as shown in FIG. 6.

The upper hook 6, seen in FIG. 2, comes into contact with the side of a recess 21 facing away from the pin 24 in every position of the intermediate plate 8, whilst the lower hook 6, seen in FIG. 2, comes into contact with a side of a recess 21 facing towards the pin 24 in every case. This makes it possible to position the intermediate plate 8 in four different orientations with respect to the carrier 3, in each of which orientations a desired locking engagement can be realised by means of the pin 24.

It is also possible for the Z-sections to extend parallel to the directions indicated by the arrows P1, P2. The sections should not be connected to the guides until the guides have been moved out in that case.

It is also possible to fit the intermediate plate 14 with hooks which can be inserted into recesses formed in the carrier.

The advantage of the embodiment that is shown in the FIGS., however, is that the hooks on the carrier will be partially disposed in spaces available in the intermediate plate, so that relatively compact construction is obtained.

What is claimed is:

1. A device suitable for suspending a component said device comprising a carrier comprising at least one hook and an opening, as well as an intermediate plate comprising at least one recess which can be positioned over said hook as well as a passage positioned coaxially opposite the opening present in the carrier, which intermediate plate further comprises a resilient strip extending substantially parallel to the intermediate plate, which strip is provided with a pin which is supported in the passage, said pin being movable against spring force from a first position, in which said pin is disposed in the opening in the carrier, to a second position, in which said pin is disposed outside said opening.

2. A device suitable for suspending a component, said device including a carrier having an opening thereon, as well as an intermediate plate adapted to be supported on said carrier and having a passage positioned coaxially opposite the opening present in the carrier, when the intermediate plate is supported thereby, the intermediate plate further comprising a resilient strip extending substantially parallel to the intermediate plate, which strip is provided with a pin which is supported in the passage, said pin being movable against spring force from a first position, in which said pin is disposed in the opening in the carrier, to a second position, in which said pin is disposed outside said opening.

3. A device according to claim 1 or 2, characterized in that the intermediate plate comprises four recesses which are symmetrically disposed relative to the passage, with the strip extending diagonally between said four recesses.

4. A device according to claim 1 or 2, characterized in that one end of the strip can be moved against spring force by means of an unlocking mechanism.

5. A device according to claim 1 or 2, characterized in that the intermediate plate comprises at least one guide which is movably connected to the intermediate plate.

6. A device according to claim 5, characterized in that a section comprising two staggered strips as well as a bridge member interconnecting said strips is present on a side of said guide that faces away from the intermediate plate, and each strip is provided with openings.

7. A device according to claim 6, characterized in that the openings in said strips are staggered relative to each other in the longitudinal direction of the strips.

8. A device according to claim 1 or 2 whereby said component is a flat panel display screen.

9. A device suitable for suspending a component according to claim 2, whereby the intermediate plate comprises at least one recess for engaging a hook in said carrier.

10. A device suitable for suspending a component according to claim 2, whereby the intermediate plate comprises at least a member for engaging a mating member on said carrier.

11. A device suitable for suspending a component, said device comprising:
   a carrier;
   an intermediate plate adapted to be coupled to said component;
   one of said carrier and said intermediate plate having at least one hook member and another one of said carrier and said intermediate plate having at least one recess for receiving said at least one hook member when said intermediate plate is supported on said member;
   said carrier having an opening therein and said intermediate plate having a passage therein, the passage being coaxially aligned with said opening when said intermediate plate is supported on said carrier; and
   a pin whose axial position is controlled by a control member, said pin being movable against spring force from a first position in which said pin is disposed in said opening and in said passage to lock said intermediate plate in a supported position on said carrier, to a second position in which said intermediate plate maybe disengaged from said carrier.

12. The device of claim 11 further including a locking device having a lock position and an unlock position, the Jock position of said locking device inhibiting manual operation of said control member.

* * * * *